United States Patent
Nagao et al.

(10) Patent No.: US 11,184,475 B2
(45) Date of Patent: Nov. 23, 2021

(54) MOBILE APPARATUS, TERMINAL APPARATUS, INFORMATION PROCESSING SYSTEM, INFORMATION PROCESSING METHOD, PROGRAM FOR MOBILE APPARATUS, AND PROGRAM FOR TERMINAL APPARATUS

(71) Applicant: PIONEER CORPORATION, Tokyo (JP)

(72) Inventors: Shunichiro Nagao, Kawagoe (JP); Masashi Takano, Kawagoe (JP); Hirofumi Shimokawa, Kawagoe (JP); Kazuya Hata, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 80 days.

(21) Appl. No.: 16/499,172

(22) PCT Filed: Mar. 2, 2018

(86) PCT No.: PCT/JP2018/008009
§ 371 (c)(1),
(2) Date: Sep. 27, 2019

(87) PCT Pub. No.: WO2018/180198
PCT Pub. Date: Oct. 4, 2018

(65) Prior Publication Data
US 2021/0112153 A1    Apr. 15, 2021

(30) Foreign Application Priority Data

Mar. 29, 2017 (JP) .............................. JP2017-065431

(51) Int. Cl.
*H04M 1/72418* (2021.01)
*G08B 25/08* (2006.01)
*G08B 25/10* (2006.01)

(52) U.S. Cl.
CPC ........ *H04M 1/72418* (2021.01); *G08B 25/08* (2013.01); *G08B 25/10* (2013.01)

(58) Field of Classification Search
CPC ......... H04W 4/90; H04W 4/029; H04W 4/48; H04W 4/80; H04W 4/027; H04W 4/38;
(Continued)

(56) References Cited

U.S. PATENT DOCUMENTS 9,457,754 B1 * 10/2016 Christensen ........... B60Q 1/525
2009/0002145 A1    1/2009 Berry et al.
(Continued)

FOREIGN PATENT DOCUMENTS

JP    2005044060 A     2/2005
JP    2010533904 A    10/2010
(Continued)

OTHER PUBLICATIONS

International Search Report for related International Application No. PCT/JP2018/008009, dated Apr. 10, 2018; English translation provided; 4 pages.
(Continued)

*Primary Examiner* — Kwasi Karikari
(74) *Attorney, Agent, or Firm* — Procopio, Cory, Hargreaves & Savitch LLP (57) ABSTRACT

Provided is an information processing system with which an unnecessary alert to an emergency contact, for example, can be prevented and an increase in the communication volume for notification can be suppressed. An in-vehicle apparatus AP which is connectable to a smartphone SP and which is mounted on a vehicle is provided with: an interface 1 which acquires acceleration data indicating that a predetermined threshold value or more of impact has been applied to the smartphone SP; a display control unit 2 which, when the acceleration data have been acquired, makes a notification
(Continued)

for selecting cancellation of a corresponding external alert; an operation control unit 3 which accepts a cancellation operation with respect to the notification; and a state management/information processing module 4 which cancels the external alert when the cancellation operation has been accepted.

13 Claims, 3 Drawing Sheets

(58) Field of Classification Search
CPC ....... H04W 4/40; H04W 76/14; H04W 76/15; H04W 76/50
See application file for complete search history.

(56) References Cited

U.S. PATENT DOCUMENTS

| | | | | |
|---|---|---|---|---|
| 2010/0085171 | A1* | 4/2010 | Do | G08B 25/08 340/426.1 |
| 2010/0227582 | A1 | 9/2010 | Berry et al. | |
| 2011/0098017 | A1 | 4/2011 | Berry et al. | |
| 2014/0024334 | A1 | 1/2014 | Berry et al. | |
| 2015/0145662 | A1 | 5/2015 | Barfield, Jr. et al. | |
| 2015/0149218 | A1* | 5/2015 | Bayley | B60R 21/0136 705/4 |
| 2017/0053461 | A1* | 2/2017 | Pal | G08B 25/00 |
| 2018/0268626 | A1 | 9/2018 | Arashima et al. | |

FOREIGN PATENT DOCUMENTS

| | | |
|---|---|---|
| JP | 2014216737 A | 11/2014 |
| JP | 2015159370 A | 9/2015 |
| JP | 2016053584 A | 4/2016 |
| WO | 2016113697 A1 | 7/2016 |
| WO | 2016143552 A1 | 9/2016 |

OTHER PUBLICATIONS

Extended Search Report dated Nov. 19, 2020 issued in corresponding European Patent Application No. 18774279.6; 3 pages.

* cited by examiner

MOBILE APPARATUS, TERMINAL APPARATUS, INFORMATION PROCESSING SYSTEM, INFORMATION PROCESSING METHOD, PROGRAM FOR MOBILE APPARATUS, AND PROGRAM FOR TERMINAL APPARATUS

CROSS-REFERENCE TO RELATED APPLICATIONS

This application is a U.S. National Stage entry of PCT Application No: PCT/JP2018/008009 filed Mar. 2, 2018, which claims priority to Japanese Patent Application No. 2017-065431, filed on Mar. 29, 2017, the contents of which are incorporated herein by reference.

TECHNICAL FIELD

The present invention belongs to the technical fields of mobile apparatuses, terminal apparatuses, information processing systems, information processing methods, programs for mobile apparatuses, and programs for terminal apparatuses. More specifically, the present invention belongs to the technical fields of an information processing system including a portable terminal apparatus and a mobile apparatus that is connectable to the terminal apparatus and is mounted on a mobile object such as a vehicle, a mobile apparatus and terminal apparatus included in the information processing system, an information processing method executed in each of the mobile apparatus and the terminal apparatus, and the program for the mobile apparatus and the program for the terminal apparatus.

BACKGROUND ART

Recently, it has been generalized to mount a so-called smartphone having a navigation function on, for example, a dashboard of a vehicle and to guide the vehicle. On the other hand, in a case where an accident occurs in a vehicle equipped with a smartphone in this manner, an impact resulting from the accident is also applied to the smartphone. Therefore, conventionally, in a case where it is detected that a predetermined impact is applied to a smartphone mounted in a vehicle, the smartphone automatically performs a necessary notification from the smartphone to an emergency contact registered in advance. As the citation list which has disclosed such a configuration, there is, for example, Patent Literature 1 described below.

At this time, according to the technology disclosed in Patent Literature 1 below, when it is detected that a predetermined impact is applied to a smartphone, after a certain time set in advance from the impact, the smartphone automatically notifies an emergency contact that is set in advance automatically. Further, according to the technology disclosed in Patent Literature 1 below, in a case where an operation to cancel the notification is performed on the smartphone before the predetermined time elapses, the notification is not performed.

CITATION LIST

Patent Literature

Patent Literature 1: JP 2014-216737 A

SUMMARY OF INVENTION

Technical Problem Solved by the Invention

Here, in addition to the impact resulting from the accident, there is a case where a predetermined impact is applied to the smartphone mounted on the dashboard resulting from a touch by a hand of, for example, a driver or a passenger. Then, it can be considered that, as a result of such the impact, the driver or the passenger may lose sight of the smartphone resulting from the smartphone itself coming out of its mounting position and rolling under the seat of the driver's seat or the passenger's seat, for example.

Here, in a case where the smartphone is lost in this manner, for example, even if the remaining time until the notification to the emergency contact is displayed on the smartphone, it cannot be confirmed, and, further, even if a button for the cancel is displayed, it cannot be operated. As a result, the emergency contact will be automatically notified after the certain time has elapsed. Therefore, there is a problem, in a case where an impact other than the impact resulting from the accident is applied to the smartphone for example, a useless notification is sent to the emergency contact. Then, the transmission of such the useless notification results in an increase in the communication volume on the network for the notification.

Therefore, the application has been made in view of the above problems, and an example of the object thereof is to provide a mobile apparatus and a terminal apparatus, an information processing system including them, an information processing method performed in the mobile apparatus and the terminal apparatus, program for the mobile apparatus and the terminal apparatus in which unnecessary notification to the emergency contact can be prevented and the increase in the communication volume on the network for the notification can be suppressed.

Solution to Solve the Problem

For solving the problem, the invention described in claim 1 is a mobile apparatus that is connectable to a portable terminal apparatus and is mounted on a mobile object, the mobile apparatus, comprising: an acquisition means which acquires impact information indicating that an impact equal to or greater than a preset threshold is applied to the terminal apparatus; a notification means which performs selection notification for selecting cancel of external notification corresponding to the impact information in a case where the impact information is acquired; an acceptance means which accepts the selection of cancel; and a control means which cancels the notification in a case where the selection of cancel is accepted.

For solving the problem, the invention described in claim 6 is a portable terminal apparatus that is connectable to a mobile apparatus mounted on a mobile object, the terminal apparatus comprising: a detection means which detects whether an impact equal to or greater than a preset threshold is applied; a notification control means which performs external notification corresponding to the impact in a case where the impact is applied; a selection notification control means which causes the mobile apparatus to perform selection notification for selecting cancel of the notification; and an acquisition means which acquires, from the mobile apparatus, cancel selection information indicating that the selection of cancel for the selection notification has been accepted by the mobile apparatus, wherein the notification control means performs the notification in a case where the cancel selection information is not acquired, and cancels the notification in a case where the cancel selection information is acquired.

For solving the problem, the invention described in claim 9 is an information processing system including a portable terminal apparatus and a mobile apparatus mounted on a mobile object, the portable terminal apparatus and the mobile apparatus being connectable to each other, wherein the terminal apparatus comprises: a detection means which detects whether an impact equal to or greater than a preset threshold is applied; a notification control means which performs external notification corresponding to the impact in a case where the impact is applied; a selection notification control means which causes the mobile apparatus to perform selection notification for selecting cancel of the notification; and an acquisition means which acquires, from the mobile apparatus, cancel selection information indicating that the selection of cancel for the selection notification has been accepted by the mobile apparatus, the mobile apparatus comprises: a notification means which performs the selection notification; an acceptance means which accepts the selection of cancel; and an output means which outputs the cancel selection information indicating that the selection of cancel is accepted to the terminal apparatus, and the notification control means of the terminal apparatus performs the notification in a case where the cancel selection information is not acquired, and cancels the notification in a case where the cancel selection information is acquired.

For solving the problem, the invention described in claim 10 is an information processing method that is performed in a mobile apparatus that is connectable to a portable terminal apparatus and is mounted on a mobile object, the mobile apparatus comprising an acquisition means, a notification means, an acceptance means, and a control means, the information processing method, comprising: an acquisition step of acquiring, by the acquisition means, impact information indicating that an impact equal to or greater than a preset threshold is applied to the terminal apparatus; a notification step of performing, by the notification means, a selection notification for selecting cancel of external notification corresponding to the impact information in a case where the impact information is acquired; an acceptance step of accepting selection of cancel for the selection notification by the acceptance means; and a control step of canceling the notification by the control means in a case where the selection of cancel is accepted.

For solving the problem, the invention described in claim 11 is an information processing method performed in a portable terminal apparatus that is connectable to a mobile apparatus mounted on a mobile object, the terminal apparatus comprising a detection means, a notification control means, a selection notification control means, and an acquisition means, the information processing method, comprising: a detection step of detecting, by the detection means, whether an impact equal to or greater than a preset threshold is applied; a notification control step of causing the notification control means to perform external notification corresponding to the impact in a case where the impact is applied; a selection notification control step of causing the mobile apparatus to perform selection notification for selecting the cancel of the notification by the selection notification control means; and an acquisition step of acquiring, from the mobile apparatus by the acquisition means, cancel selection information indicating that the selection of cancel for the selection notification has been accepted by the mobile apparatus, wherein the notification control step performs the notification in a case where the cancel selection information is not acquired, and cancels the notification in a case where the cancel selection information is acquired.

For solving the problem, the invention described in claim 12 is a program for a mobile apparatus that causes a computer included in the mobile apparatus that is connectable to a portable terminal apparatus and is mounted on a mobile object, to function as: an acquisition means which acquires impact information indicating that an impact equal to or greater than a preset threshold is applied to the terminal apparatus; a notification means which performs selection notification for selecting cancel of external notification corresponding to the impact information in a case where the impact information is acquired; and a control means which cancels the notification in a case where the selection of cancel for the selection notification is accepted.

For solving the problem, the invention described in claim 13 is a program for a terminal apparatus that causes a computer included in the portable terminal apparatus that is connectable to a mobile apparatus mounted on a mobile object, to function as: a detection means which detects whether an impact equal to or greater than a preset threshold is applied; a notification control means which performs external notification corresponding to the impact in a case where the impact is applied; a selection notification control means which causes the mobile apparatus to perform selection notification for selecting cancel of the notification; and an acquisition means which acquires, from the mobile apparatus, cancel selection information indicating that the selection of cancel for the selection notification has been accepted by the mobile apparatus, wherein the program causes the computer that functions as the notification control means to perform the notification in a case where the cancel selection information is not acquired, and cancels the notification in a case where the cancel selection information is acquired.

BRIEF DESCRIPTION OF DRAWINGS

FIG. 4(a) is a front view illustrating a first example, FIG. 4(b) is a front view illustrating a second example, and FIG. 4(c) is a front view illustrating a third example.

DESCRIPTION OF EMBODIMENTS

Figure 1:
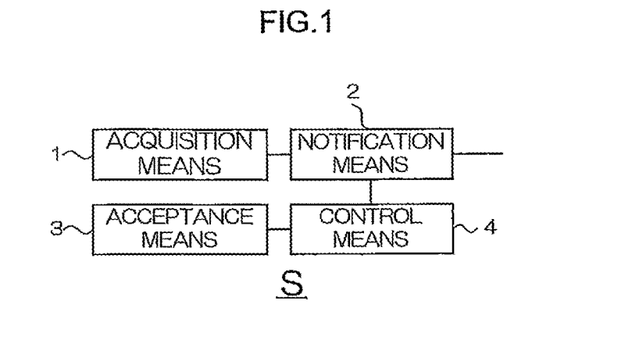
FIG. 1 is a block figure illustrating a schematic configuration of a mobile apparatus according to an embodiment.

Next, the embodiment for carrying out the present application will be described with reference to FIG. 1. Note that FIG. 1 is a block figure illustrating a schematic configuration of a mobile apparatus according to the embodiment.

The mobile apparatus according to the embodiment is connectable to a portable terminal apparatus and is mounted on a mobile object. In addition, as illustrated in FIG. 1, a mobile apparatus S according to the embodiment comprises an acquisition means 1, a notification means 2, an acceptance means 3, and a control means 4.

In the above configuration, the acquisition means 1 acquires impact information indicating that an impact equal to or greater than a preset threshold is applied to the terminal apparatus.

Then, in a case where the impact information is acquired by the acquisition means 1, the notification means 2 performs selection notification for selecting cancel of external notification corresponding to the impact information.

Further, the acceptance means 3 accepts selection of cancel for the selection notification.

Thereby, the control means 4 cancels notification to the outside, in a case where the selection of cancel is accepted.

As described above, according to the operation of the mobile apparatus S according to the embodiment, in a case where impact information indicating that an impact equal to or greater than a predetermined threshold has been applied to the terminal apparatus is acquired, the mobile apparatus makes a selection notification to select cancel of external notification corresponding to the impact information, and in a case where the selection of cancel for the selection notification is accepted, the external notification is canceled. Therefore, in a case where an impact is applied to the terminal apparatus to the extent that a user can operate for the selection of cancel, no notification is made to the outside, and unnecessary notifications can be prevented, and an increase in communication volume due to the notifications to the outside can be suppressed.

EXAMPLES

Next, specific examples corresponding to the above-described embodiment will be described using FIGS. 2 to 4. The embodiment described below is an embodiment in which the present application is applied to information processing in an information processing system provided with a so-called smartphone and an in-vehicle apparatus.

Figure 2:
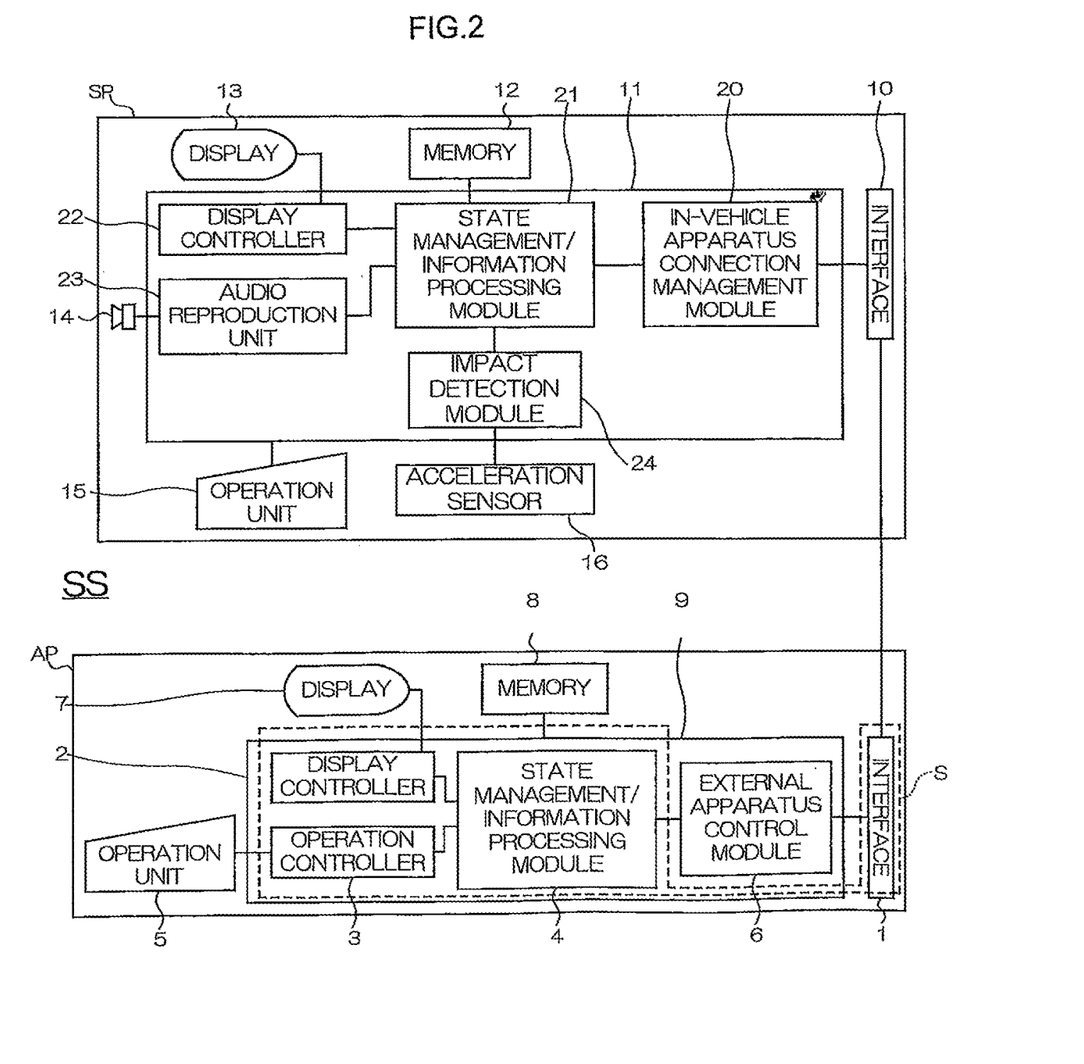
FIG. 2 is a block figure illustrating a schematic configuration of an information processing system according to the embodiment.

Further, FIG. 2 is a block figure illustrating a schematic configuration of the information processing system according to the embodiment. FIG. 3 is a flowchart illustrating information processing according to the embodiment. FIG. 4 is a front view illustrating an operation example in the information processing system. At this time in FIGS. 2 and 4, for respective component members of the embodiment corresponding to each component member in the mobile apparatus S according to the embodiment illustrated in FIG. 1, the same member numbers as each of the component members in the mobile apparatus S are used.

As illustrated in FIG. 2, an information processing system SS according to the example comprises a smartphone SP as an example of the "terminal apparatus" according to the present application, and an in-vehicle apparatus AP. At this time, the smartphone SP is portable, and the in-vehicle apparatus AP is mounted in a vehicle (not illustrated) on which the information processing system SS according to the example is mounted.

In addition, the smartphone SP according to the example comprises an interface 10, a processing unit 11 including a CPU, a random access memory (RAM), a read only memory (ROM), and the like, a memory 12 including a solid state drive (SSD) and the like, a display 13 including a liquid crystal display and the like, a speaker 14, an operation unit 15 including a touch panel, operation buttons, or the like provided on a surface of the display 13, and an acceleration sensor 16. The processing unit 11 further comprises an in-vehicle apparatus connection management module 20, a state management/information processing module 21, a display controller 22 connected to the display 13, an audio reproduction unit 23 connected to the speaker 14, and an impact detection module 24 connected to the acceleration sensor 16. At this time, each of the in-vehicle apparatus connection management module 20, the state management/information processing module 21, the display controller 22, the audio reproduction unit 23, and the impact detection module 24 may comprise a hardware logic circuit such as the above-described CPU included in the processing unit 11, and may be realized in software by causing the CPU of the processing unit 11 to read and execute a program corresponding to the process in the smartphone SP in the information processing according to the example to be described later. In addition, the interface 10 corresponds to an example of an "acquirement means" according to the present application, the acceleration sensor 16 corresponds to an example of a "detection means" according to the present application, the state management/information processing module 21 corresponds to an example of a "notification control means" and an example of a "selection notification control means" according to the present application, the display 13 and the display controller 22 correspond to an example of a "notification means" according to the present application, and the operation unit 15 corresponds to an example of an "acceptance means" according to the present application.

In the configuration of the above-described smartphone SP, the interface 10 and the in-vehicle apparatus connection management module 20 respectively control data exchange with the in-vehicle apparatus AP and data exchange with a network (not illustrated) under the control of the state management/information processing module 21. Further, the display controller 22 also controls display contents on the display 13 under the control of the state management/information processing module 21. Thus, the display 13 displays necessary information under the control of the display controller 22. On the other hand, under the control of the state management/information processing module 21, the audio reproduction unit 23 executes synthesis processing or the like of sounds or voices to be emitted from the speaker 14. Thus, the speaker 14 emits a voice corresponding to voice data generated by the audio reproduction unit 23 or a sound corresponding to sound data generated by the audio reproduction unit 23. On the other hand, the acceleration sensor 16 detects an acceleration corresponding to an impact applied to the smartphone SP, generates acceleration data indicating, for example, the magnitude and direction of the acceleration, and outputs the acceleration data to the impact detection module 24. Then, the impact detection module 24 analyzes the contents of the acceleration data from the acceleration sensor 16 under the control of the state management/information processing module 21, and generates impact data indicating the magnitude, direction, and the like of the impact corresponding to the acceleration, and outputs the impact data to the state management/information processing module 21. In addition, when an operation by the user for specifying the operation of the smartphone SP is executed in the operation unit 15, the operation unit 15 generates an operation signal corresponding to the operation and outputs the operation signal to the state management/information processing module 21. Then, based on the operation signal from the operation unit 15, the state management/information processing module 21 mainly executes processing in the smartphone SP among the information processing according to the example, while controlling each of the in-vehicle apparatus connection management module 20, the display controller 22, the audio reproduction unit 23, and the impact detection module 24. Further, the state management/information processing module 21 centrally controls processes other than information processing according to the example as the smartphone SP. Data and the like necessary for processing in the state management/ information processing module 21 are recorded in the memory 12 as necessary and further read out from the memory 12 as necessary.

On the other hand, the in-vehicle apparatus AP according to the embodiment comprises an interface 1, a processing unit 9 including a CPU, a RAM, a ROM, and the like, a memory 8 including an SSD and the like, a display 7 including a liquid crystal display and the like, and an operation unit 5 including an operation button and the like. The processing unit 9 further comprises an external apparatus connection module 6, a state management/information processing module 4, a display controller 2 connected to the display 7, and an operation controller 3 connected to the operation unit 5. At this time, each of the external apparatus control module 6, the state management/information processing module 4, the display controller 2 and the operation controller 3 may comprise a hardware logic circuit such as the above-described CPU that constitutes the processing unit 9, or may be realized in software by causing the CPU of the processing unit 9 to read and execute a program corresponding to the processes in the in-vehicle apparatus AP in the information processing according to the embodiment to be described later. Then, the interface 1 corresponds to an example of the acquisition means 1 according to the embodiment, the display controller 2 corresponds to an example of the notification means 2 according to the embodiment, the operation controller 3 corresponds to an example of the acceptance means 3 according to the embodiment, and the state management/information processing module 4 corresponds to an example of the control means 4 according to the embodiment. Furthermore, the operation unit 5 corresponds to an example of the "cancel operation means" and an example of the "notification operation means" according to the present application. In addition, as indicated by a broken line in FIG. 2, the interface 1, the display controller 2, the operation controller 3, and the state management/information processing module 4 constitute an example of the mobile apparatus S according to the embodiment.

In the above-described configuration of the in-vehicle apparatus AP, the interface 1 and the external apparatus control module 6 control exchange of data with the smartphone SP under the control of the state management/information processing module 4. Note that, the connection between the interface 1 and the interface 10 of the smartphone SP may be performed by short-range wireless communication based on, for example, the near field communication (NFC) standard or the like, or may be physically connected by a cable, a connector, and/or the like. Further, the display controller 2 also controls the display content on the display 7 under the control of the state management/ information processing module 4. Thereby, the display 7 displays necessary information under the control of the display controller 2. In addition, when an operation by the user for specifying the operation of the in-vehicle apparatus AP is executed in the operation unit 5, the operation unit 5 generates an operation signal corresponding to the operation and outputs the operation signal to the state management/ information processing module 4 via the operation controller 3. On the other hand, the operation controller 3 controls the respective functions of operation buttons described later that constitute the operation unit 5 under the control of the state management/information processing module 4. More specifically, the operation controller 3 assigns a function different from the initial setting of each operation button as a part of the processing in the in-vehicle apparatus AP in the information processing according to the example. The function assignment Lo the operation button will be described in detail later. Then, based on the operation signal from the operation unit 5, the state management/information processing module 4 mainly executes processing in the in-vehicle apparatus AP in the information processing according to the embodiment, while controlling each of the external apparatus control module 6, the display controller 2, and the operation controller 3. Further, the state management/information processing module 4 integrally controls processing other than the information processing according to the example as the in-vehicle apparatus AP.

Next, information processing according to the example of the information processing system SS having the above-described configuration will be specifically described with reference to FIGS. 2 to 4.

Figure 3:
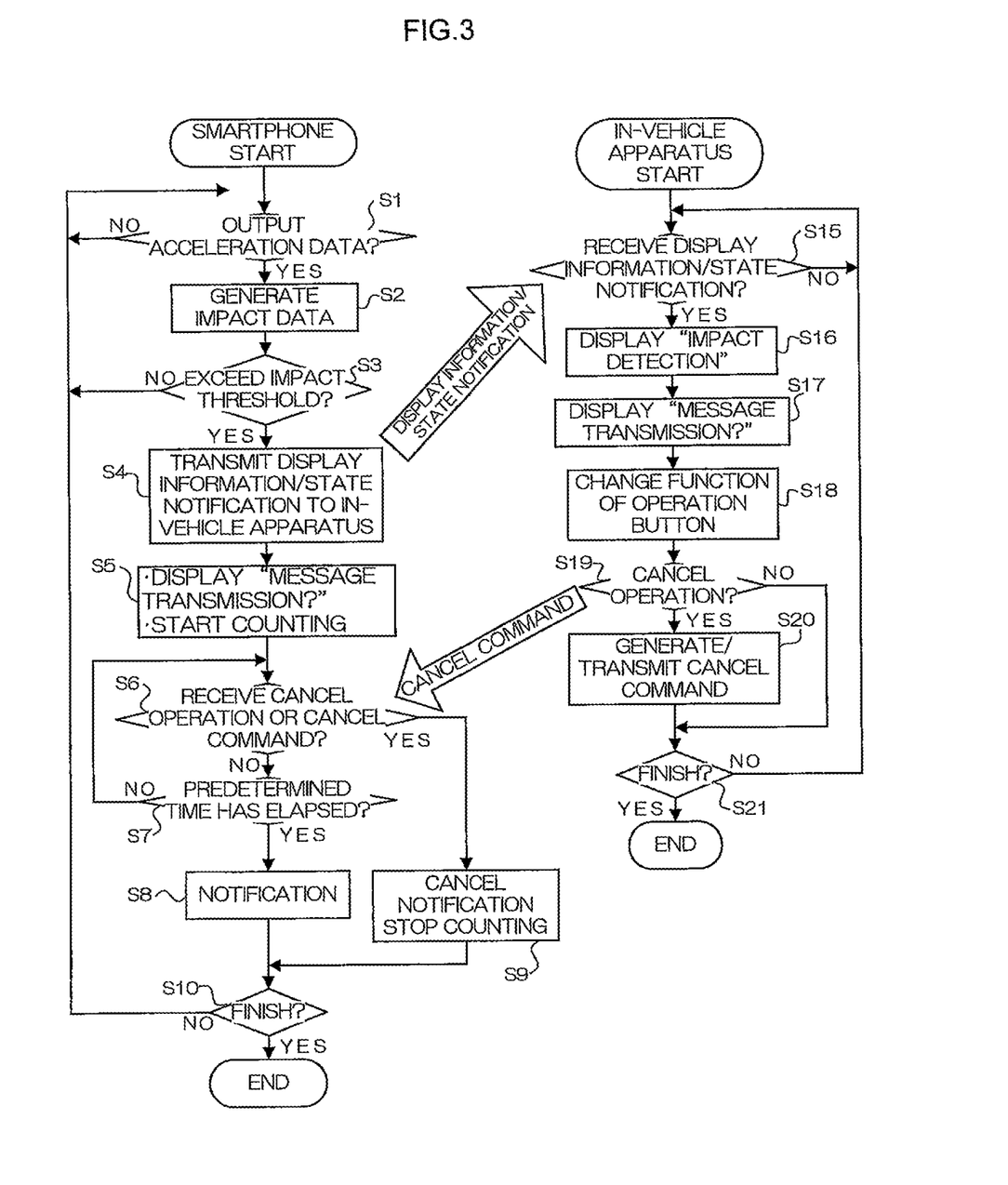
FIG. 3 is a flowchart illustrating information processing according to the embodiment.

As illustrated in the flowchart on the left of FIG. 3, the process in the smartphone SP among the information processing according to the embodiment is started, for example, from the timing when the power switch (not illustrated) of the smartphone SP is turned on. Then, when the process is started, the state management/information processing module 21 of the smartphone SP starts monitoring whether any value of acceleration data is output from the acceleration sensor 16 via the impact detection module 24 (step S1). In a case where the acceleration data of any value is not output in the monitoring of step S1 (step S1: NO), the state management/information processing module 21 and the impact detection module 24 return to the step S1 and continue the monitoring. On the other hand, in a case where acceleration data of any value is output in the monitoring in step S1 (step S1: YES), the impact detection module 24 analyzes the contents of the output acceleration data, and generates the impact data corresponding to the acceleration that causes the output of the acceleration data, and outputs the impact data to the state management/information processing module 21 (step S2). Thereby, the state management/information processing module 21 determines whether the magnitude of the impact indicated by the output impact data exceeds the preset impact threshold recorded in the memory 12 (step S3). Here, the impact threshold value is, for example, an impact threshold value corresponding to an acceleration (impact) to the extent that the smartphone SP according to the example falls off from the mounting position (for example, an upper part of the in-vehicle apparatus AP according to the example, a dashboard of a vehicle, or the like) and drops. More specifically, the impact threshold value is set in advance empirically or experimentally according to the method or mode of wearing the smartphone SP. In the determination of step S3, if the magnitude of the impact indicated by the output impact data does not exceed the impact threshold (step S3: NO), assuming that the smartphone SP is not out of the original mounting position, the state management/information processing module 21 and the impact detection module 24 return to step S1 and continue the monitoring. On the other hand, in the determination of step S3, if the magnitude of the impact indicated by the output impact data exceeds the impact threshold (step S3: YES), the state management/information processing module 21 next causes the display 13 to displays, for example, "impact detection" via the display controller 22 for a predetermined time. In addition to this, the state management/information processing module 21 generates display information/state notification indicating that the impact detection should be displayed on the in-vehicle apparatus AP and that the impact exceeding the above-described impact threshold is detected on the smartphone SP, and transmits the display information/state notification to the in-vehicle apparatus AP via the in-vehicle apparatus connection management module 20 and the interface 10 (step S4).

On the other hand, as illustrated in the flowchart on the right of FIG. 3, the process in the in-vehicle apparatus AP among the information processing according to the example is started, for example, from the timing when the power switch (not illustrated) of the in-vehicle apparatus AP is turned on. Then, when the process is started, the state management/information processing module 4 of the in-vehicle apparatus AP starts monitoring whether the display information/state notification has been transmitted from the smartphone SP via the external apparatus control module 6 and the interface 1 (step S15). In a case where the display information/state notification is not transmitted in the monitoring in step S15 (step S15: NO), the state management/information processing module 4 and the external apparatus control module 6 return to the step S15 and continue the above monitoring. On the other hand, in a case where the display information/status notification has been transmitted from the smartphone SP in the monitoring in step S15 (step S15: YES), next, the state management/information processing module 4 causes the display 7 to display "impact detection" via the display controller 2 (step S16).

Figure 4:
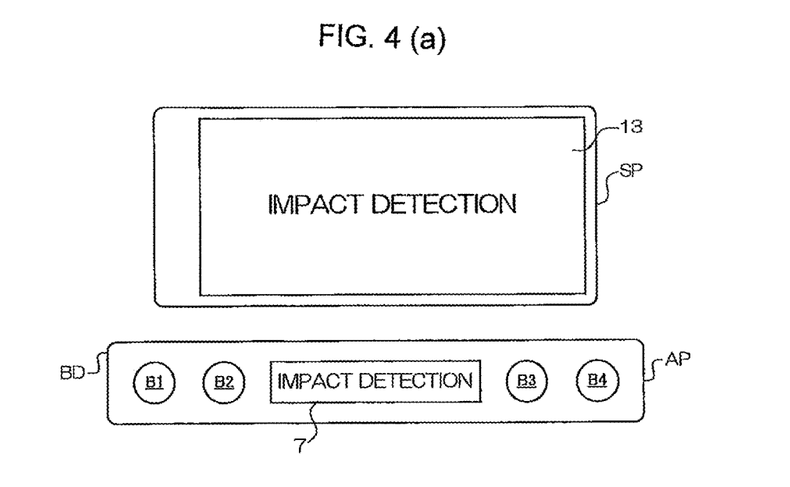
FIG. 4 is a front view illustrating an operation example in the information processing system according to the embodiment.

In a case where the above step S4 and step S16 are executed, as illustrated in the front view of FIG. 4(a), the characters "impact detection" are displayed on each of the display 13 of the smartphone SP and the display 7 of the in-vehicle apparatus AP. Note that, the front view illustrated in FIG. 4 exemplifies the state in which the smartphone SP is separated from the mounting position on the in-vehicle apparatus AP, assuming that an impact with a magnitude exceeding the impact threshold is applied to the smartphone SP. Further, in the display of the "collision detection", for example, the color of the character may be changed from the commonly used character color, or a voice guidance may be emitted simultaneously.

As illustrated in FIG. 4, on the front surface of the in-vehicle apparatus AP stored in a housing BD and mounted in the vehicle, operation buttons B1 to B4 (operation buttons that can be physically pressed for each) constituting the operation unit 5 are provided with the display 7 interposed therebetween. Different functions are assigned to these operation buttons B1 to B4 as initial settings. More specifically, for example, functions such as "music playback", "moving image playback", and "calling" are assigned as initial settings. Then, the function of these initial settings is changed by the operation controller 3 to a function such as "notification cancel" or "notification execution" described later.

Returning to FIG. 3, when the above-described certain time that should continue the display of "impact detection" in step S4 has elapsed, the state management/information processing module 21 that has executed step S4 described above next changes the display on the display 13 to "message transmission?" to notify the outside that an impact having a magnitude equal to or greater than the impact threshold has been applied to the smartphone SP (step S5). In addition to this, the state management/information processing module 21 starts counting, in a timer (not illustrated), of a threshold time set in advance as a time from when an impact having a magnitude equal to or greater than the impact threshold is applied until the above-described notification is performed (step S5). On the other hand, when the above-described certain time that should continue the display of "impact detection" in step S16 has elapsed, the state management/information processing module 4 that has executed step S16 described above next changes the display on the display 7 to "message transmission?" indicating that the external notification is performed, via the display controller 2 (step S17). The display of "message transmission?" corresponds to an example of "selection notification" according to the present application.

In a case where the above step S5 and step S17 are executed, as illustrated in the front view of FIG. 4(b), the characters "message transmission?" are displayed on each of the display 13 of the smartphone SP and the display 7 of the in-vehicle apparatus AP. In this case, the display 7 of the in-vehicle apparatus AP may further display the remaining time until the execution of the notification, for example, "remaining time xx seconds". In addition, as illustrated in FIG. 4(b), the state management/information processing module 21 of the smartphone SP displays an OK button 32 operated by the user in the case of performing external notification, and a cancel button 31 operated by the user in the case of not making the external notification (in the case of canceling) on the display 13 together (step S5).

Further, the state management/information processing module 4 of the in-vehicle apparatus AP that has executed step S17 changes the function of the operation button B1 and the operation button B2 on the left side to the above-described notification cancel function via the operation controller 3, and further changes the functions of the operation button B3 and the operation button B4 on the right side to the function for executing the notification (step S18). After that, the state management/information processing module 4 starts monitoring whether the operation button B1 or the operation button B2 changed to the notification cancel function is operated (pressed) (step S19). The operation of the operation button B1 or the operation button B2 in which the assignment function is changed to the notification cancel function corresponds to an example of "selection of cancel" according to the present application. In the monitoring of step S19, in a case where neither the operation button B1 nor the operation button B2 is operated (step S19: NO), the state management/information processing module 4 proceeds to step S21 described later. On the other hand, in the monitoring of step S19, in a case where the operation button B1 or the operation button B2 is operated (step S19: YES), corresponding to the function of the above-described notification cancel assigned to the operation button B1 or the operation button B2 at that time, the state management/information processing module 4 generates a cancel command for canceling the external notification, and transmits the cancel command to the smartphone SP via the external apparatus control module 6 and the interface 1 (step S20). After that, the state management/information processing module 4 determines whether to end the processing in the in-vehicle apparatus AP among the information processing according to the example because the power switch of the in-vehicle apparatus AP is turned off (step S21)). In a case where the process is ended in the determination of step 321 (step S21: YES), the state management/information processing module 4 ends the process as it is. On the other hand, in a case where the process is continued in the determination of step S21 (step S21: NO), the state management/information processing module 4 returns to step S15 and repeats a series of the processes described above.

Next, the state management/information processing module 21 that has executed step S5 monitors whether the cancel button 31 is operated on the display 13 of the smartphone SP or whether the cancel command is transmitted from the in-vehicle apparatus AP (step S6). In the monitoring of step S6, in a case where the cancel button 31 is operated or the cancel command is transmitted (step S6: YES), the state management/information processing module 21 cancels the external notification and stops counting the threshold time by the timer (step S9). Thereafter, the state management/information processing module 21 proceeds to step S10 described later. On the other hand, in the monitoring of step S6, in a case where the cancel button 31 is not operated, and the cancel command is not transmitted (step S6: NO), the state management/information processing module 21 determines whether the threshold time has elapsed (step S7). If it is determined in step S7 that the threshold time has not passed yet (step S7: NO), the state management/information processing module 21 returns to step S6 and continues monitoring the operation of the cancel button 31 and the transmission of the cancel command. On the other hand, in a case where the threshold time has elapsed in the determination of step S7 (step S7: YES), the state management/information processing module 21 performs the external notification through the interface 10 (step S8). At this time, the external notification is performed, for example, by one or a plurality of the following methods.

i) Send an e-mail to a preset destination
ii) Call to a preset person
iii) Notify via communicable vehicle information communication system (VICS) (registered trademark).
iv) Notify by so-called communication between vehicles or communication between a vehicle and a pedestrian.

After that, the state management/information processing module 21 determines whether to end the process in the smartphone SP among the information processing according to the example because the power switch of the smartphone SP is turned off (step S10). In a case where the process is ended in the determination of step S10 (step S10: YES), the state management/information processing module 21 ends the process as it is. On the other hand, in a case where the process is continued in the determination of step S10 (step S10: NO), the state management/information processing module 21 returns to step S1 and repeats a series of the processes described above.

As described above, according to the operation of the information processing system SS according to the example, in a case where acceleration data indicating that acceleration equal to or greater than a predetermined threshold is applied to the smartphone SP is acquired, display to select the cancel of notification to the outside corresponding to the acceleration data is performed (refer to step S17 in FIG. 3), and in a case where an operation to cancel the display is accepted (refer to step S19: YES in FIG. 3), notification to the outside is canceled (refer to step S9 in FIG. 3). Therefore, in a case where acceleration is applied to the smartphone SP such that the user can operate for the cancel operation, since no external notification is performed, an increase in communication volume due to external notification can also be suppressed while preventing unnecessary notifications.

In addition, in a case where a stop operation is performed within the above threshold time from the timing at which acceleration data has been acquired (refer to step S6: YES in FIG. 3), notification to the outside is canceled (refer to step S9 in FIG. 3), and in a case where the cancel operation is not performed within the threshold time from the timing (refer to step S6: NO in FIG. 3), the notification is executed. Therefore, the user can select whether or not to report to the outside with sufficient time.

Furthermore, in a case where the cancel function is operated by the operation button B1 or the operation button B2 whose assignment function has been changed to notification cancel (refer to steps S18 and S19: YES in FIG. 3), since the external notification is canceled (refer to step S9 in FIG. 3), the external notification can be canceled by operating the operation button B1 or the operation button B2 at hand.

Furthermore, even if the cancel button 31 displayed on the smartphone SP is used, it is possible to cancel the external notification, and in a case where the cancel command is sent from the in-vehicle apparatus AP or in a case where the cancel button 31 is operated, since the notification to the outside is canceled (refer to step S6: YES, step S9 in FIG. 3), the external notification can be canceled by operating either the in-vehicle apparatus AP or the smartphone SP.

In the embodiment described above, the notification is performed in a case where it is determined in step S7 that the threshold time has elapsed (step S8 in FIG. 3). However, in addition to this, in a case where the notification execution operation is performed with the operation button B3 or the operation button B4 whose assignment function is changed to notification execution, a notification execution command is sent from the in-vehicle apparatus AP to the smartphone SP, and when the notification execution command is received at the smartphone SP or when the OK button 32 (refer to FIG. 4(b)) is operated, the notification from smartphone SP to the outside may be performed. In this case, it is preferable that the notification be performed in a case where the notification execution command is received or the OK button 32 is operated even before the threshold time has elapsed. According to the above configuration, in a case where the operation button B1 or the operation button B2 or the cancel button 31 to which the notification cancel function is assigned is operated, the notification to the outside is stopped, and in a case where the operation button B3 or the operation button B4 or the OK button 32 to which the notification execution function is assigned is operated, the notification to the outside is executed. Therefore, it is possible to cancel or execute notification to the outside accurately and quickly.

In the embodiment described above, although the case where the functions of the operation button B1 and the operation button B2 illustrated in FIG. 4 are changed to the above-described notification cancel function has been described (see step S18 in FIG. 3). However, for example, as illustrated in FIG. 4(c), only the cancel button 31 may be displayed on the display 13 of the smartphone SP, and the functions of the operation buttons B1 to B4 may be changed into the notification cancel function. In this case, it is preferable that the display 7 of the in-vehicle apparatus AP be configured to display the remaining time until the execution of the notification as, for example, "remaining time xx seconds" as illustrated in FIG. 4(c). Further, on the display 7, the characters "message transmission?" may be further displayed. According to this configuration, since any of the operation buttons B1 and the like to which the notification cancel function is assigned or the cancel button 31 is operated, the notification to the outside is canceled, and it is possible to stop notification to the outside accurately and quickly.

Regarding the function assignment of the operation buttons B1 to B4, the functions of operation button B1 and operation button B2 may be changed to the function of notification execution, and the functions of the operation button B3 and the operation button B4 may be changed to a notification cancel function. Furthermore, the function of the operation button B1 and the operation button B4 may be changed to the notification cancel function (or notification execution function), and the functions of the operation button B2 and the operation button B3 may be changed to a function for executing the notification (or canceling the notification).

Furthermore, in the example described above, although the case where the functions of the operation buttons B1 to B4 originally provided in the in-vehicle apparatus AP are changed to the notification cancel function or the notification execution function has been described. However, the contactable portion on the outer surface of the housing BD of the in-vehicle apparatus AP illustrated in FIG. 4 may comprise a touch sensor as an example of a "sensor means" according to the present application, and the contact with the touch sensor may have a function of canceling the notification. In this case, the notification to the outside can be canceled by a simpler touch operation.

In addition, in a case where the operation button B1 etc. is assigned to a button for canceling a notification as in the above-described example, display on the operation button B1 and the like assigned to the button for canceling the notification may be changed to a display that can be visually recognized as a button for canceling the notification (for example, display with simply displayable icons such as "X" or "NO"). Furthermore, in a case where the operation button B1 etc. is assigned to the button for executing a notification, the display on the operation button B1 or the like assigned to the notification execution button may be changed to a display that can be visually recognized as the notification execution button (for example, display with simple icons such as "OK").

Furthermore, in the example described above, in a case where an impact is detected, in addition to displaying the impact on the display 13 of the smartphone SP and the display 7 of the in-vehicle apparatus AP, for example, the display 7 may be configured to illuminate brightly simultaneously with the detection of the impact.

In addition, the remaining time until execution of the notification to the outside may be performed using voice guidance. In this case, sound may be emitted using a speaker (not illustrated) provided in the in-vehicle apparatus AP, or sound may be emitted using the speaker 14 of the smartphone SP that detects a collision using the acceleration sensor 16.

Furthermore, regarding the impact threshold according to the example, each of a forward impact threshold for acceleration due to impact from the front, a rear impact threshold for acceleration from the rear side, and a side impact threshold for acceleration from side impact may be different. Furthermore, although the threshold time is usually, for example, 10 seconds, the external notification may be executed quickly as the impact threshold increases.

In the embodiment described above, although the smartphone SP detects acceleration, in addition to this, in a case where only the in-vehicle apparatus AP is equipped with an acceleration sensor, the present application can also be applied.

Further, by recording a program corresponding to the flowchart illustrated in FIG. 3 on a recording medium such as an optical disk or a hard disk, obtaining the program via a network such as the Internet, and reading the program to execute in a general-purpose microcomputer etc., the microcomputer and the like can function as the processing unit 9 according to the example.

REFERENCE SIGNS LIST

1 Acquisition means (interface)
2 Notification means (display controller)
3 Acceptance means (operation controller)
4 Control means (status management/information processing module)
AP In-vehicle apparatus
SP Smartphone
S Mobile apparatus
SS Information processing system

The invention claimed is:

1. A mobile apparatus that is connectable to a portable terminal apparatus and is mounted on a mobile object, the mobile apparatus, comprising:
   an interface which acquires impact information indicating that an impact equal to or greater than a preset threshold is applied to the terminal apparatus, the impact information being generated in the terminal apparatus;
   a display controller which performs, in a case where the impact information is acquired, selection notification for selecting cancel of external notification corresponding to the impact information, the external notification being performed by the terminal apparatus;
   an operation controller which accepts the selection of cancel; and
   a status management/information processing module which cancels the notification in a case where the selection of cancel is accepted.

2. The mobile apparatus according to claim 1, wherein the status management/information processing module cancels the notification in a case where the selection of cancel is accepted within a preset time from the timing when the impact information is acquired, and executes the notification in a case where the selection of cancel is not accepted within the time from the timing.

3. The mobile apparatus according to claim 1, wherein the operation controller is an operation unit that is provided in the mobile apparatus for another operation purpose and in which the operation purpose is changed to an acceptance of the selection of cancel, and the status management/information processing module cancels the notification in a case where the selection of cancel is accepted by the operation unit.

4. The mobile apparatus according to claim 1, wherein the operation controller comprises:
   the operation unit provided in the mobile apparatus for another operation purpose and in which the operation purpose is changed to acceptance of the selection of cancel; and
   the operation unit provided in the mobile apparatus for another operation purpose and in which the operation purpose is changed to execution of the notification, and
   the status management/information processing module cancels the notification in a case where the selection of cancel is accepted by the operation unit, and executes the notification in a case where the execution of the notification is accepted by the operation unit.

5. The mobile apparatus according to claim 1, wherein the operation controller is a sensor provided at a contactable position on an outer surface of a housing of the mobile apparatus, and
   the status management/information processing module cancels the notification in a case where the selection of cancel is accepted by the sensor.

6. A portable terminal apparatus that is connectable to a mobile apparatus mounted on a mobile object, the terminal apparatus comprising:
   a sensor which detects whether an impact, applied to the terminal apparatus, is equal to or greater than a preset threshold is applied and generates impact information;

a notification status management/information processing module which performs external notification corresponding to the impact information in a case where the impact is applied;

a selection notification status management/information processing module which causes the mobile apparatus to perform selection notification for selecting cancel of the notification; and an interface which acquires, from the mobile apparatus, cancel selection information indicating that the selection of cancel for the selection notification has been accepted by the mobile apparatus, wherein the notification status management/information processing module performs the notification in a case where the cancel selection information is not acquired, and cancels the notification in a case where the cancel selection information is acquired.

7. The terminal apparatus according to claim 6, wherein the notification status management/information processing module performs the notification in a case where the cancel selection information is not acquired within a preset time from the timing at which the application of the impact is detected, and cancels the notification in a case where the cancel selection information is acquired within the time from the timing.

8. The terminal apparatus according to claim 6, further comprising:

a display controller which performs the selection notification; and an operation controller which accepts selection of cancel for the selection notification, wherein the notification status management/information processing module cancels the notification in a case where the cancel selection information is acquired or in a case where the selection of cancel is accepted.

9. An information processing system including a portable terminal apparatus and a mobile apparatus mounted on a mobile object, the portable terminal apparatus and the mobile apparatus being connectable to each other, wherein the terminal apparatus comprises:

a sensor which detects whether an impact, applied to the terminal apparatus, is equal to or greater than a preset threshold is applied and generates impact information;

a notification status management/information processing module which performs external notification corresponding to the impact information in a case where the impact is applied;

a selection notification status management/information processing module which causes the mobile apparatus to perform selection notification for selecting cancel of the notification; and an interface which acquires, from the mobile apparatus, cancel selection information indicating that the selection of cancel for the selection notification has been accepted by the mobile apparatus, the mobile apparatus comprises:

a display controller which performs the selection notification;

an operation controller which accepts the selection of cancel; and an output means which outputs the cancel selection information indicating that the selection of cancel is accepted to the terminal apparatus, and the notification status management/information processing module of the terminal apparatus performs the notification in a case where the cancel selection information is not acquired, and cancels the notification in a case where the cancel selection information is acquired.

10. An information processing method that is performed in a mobile apparatus that is connectable to a portable terminal apparatus and is mounted on a mobile object, the mobile apparatus comprising an interface, a display controller, an operation controller, and a status management/information processing module, the information processing method, comprising:

acquiring, by the interface, impact information indicating that an impact equal to or greater than a preset threshold is applied to the terminal apparatus, the impact information being generated in the terminal apparatus;

performing, by the display controller in a case where the impact information is acquired, a selection notification for selecting cancel of external notification corresponding to the impact information, the external notification being performed by the terminal apparatus;

accepting selection of cancel for the selection notification by the operation controller; and canceling the notification by the status management/information processing module in a case where the selection of cancel is accepted.

11. An information processing method performed in a portable terminal apparatus that is connectable to a mobile apparatus mounted on a mobile object, the terminal apparatus comprising a sensor, a notification status management/information processing module, a selection notification status management/information processing module, and an interface, the information processing method, comprising:

detecting, by the sensor, whether an impact, applied to the terminal apparatus, is equal to or greater than a preset threshold is applied and generates impact information;

causing the notification status management/information processing module to perform external notification corresponding to the impact information in a case where the impact is applied;

causing the mobile apparatus to perform selection notification for selecting the cancel of the notification by the selection notification status management/information processing module; and acquiring, from the mobile apparatus by the interface, cancel selection information indicating that the selection of cancel for the selection notification has been accepted by the mobile apparatus, wherein the causing the notification control performs the notification in a case where the cancel selection information is not acquired, and cancels the notification in a case where the cancel selection information is acquired.

12. A non-transitory recording medium recording a program for a mobile apparatus that causes a computer included in the mobile apparatus that is connectable to a portable terminal apparatus and is mounted on a mobile object, to perform:

acquisition which acquires impact information indicating that an impact equal to or greater than a preset threshold is applied to the terminal apparatus the impact information being generated in the terminal apparatus;

in a case where the impact information is acquired, selection notification for selecting cancel of external notification corresponding to the impact information, the external notification being performed by the terminal apparatus; and cancel the notification in a case where the selection of cancel for the selection notification is accepted.

13. A non-transitory recording medium recording a program for a terminal apparatus that causes a computer included in the portable terminal apparatus that is connectable to a mobile apparatus mounted on a mobile object, perform:

detecting whether an impact, applied to the terminal apparatus, is equal to or greater than a preset threshold is applied and generates impact information;

external notification corresponding to the impact information in a case where the impact is applied;

causing the mobile apparatus to perform selection notification for selecting cancel of the notification; and acquiring, from the mobile apparatus, cancel selection information indicating that the selection of cancel for the selection notification has been accepted by the mobile apparatus, wherein the program causes the computer that performs the external notification to perform the external notification in a case where the cancel selection information is not acquired, and cancels the notification in a case where the cancel selection information is acquired.

* * * * *